United States Patent
Miyamoto

(10) Patent No.: US 6,256,289 B1
(45) Date of Patent: Jul. 3, 2001

(54) STORAGE MEDIA DRIVING MOTOR WITH ROTOR MAGNET POSITION DETERMINER AND BALANCING OBJECTS

(75) Inventor: Eiji Miyamoto, Hikone (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 09/335,733

(22) Filed: Jun. 18, 1999

(30) Foreign Application Priority Data

Jun. 18, 1998 (JP) .................................................. 10-170805

(51) Int. Cl.⁷ ............................ G11B 23/00; G11B 25/00
(52) U.S. Cl. ............................................................. 369/266
(58) Field of Search ........................... 360/99.08, 99.04, 360/99.12, 99.05; 369/258, 268, 266, 264, 270, 271, 263; 310/40 R, 46

(56) References Cited

U.S. PATENT DOCUMENTS

| | | | |
|---|---|---|---|
| 3,854,347 | 12/1974 | Hellerich | 74/573 R |
| 5,111,713 | 5/1992 | Cameron et al. | 74/573 R |
| 5,633,856 | * 5/1997 | Mukawa | 369/270 |
| 6,005,311 | * 12/1999 | Matsushima | 310/51 |
| 6,005,749 | * 12/1999 | Ikuta et al. | 360/99.12 |
| 6,061,325 | * 5/2000 | Zaun | 369/264 |
| 6,125,098 | * 9/2000 | Osawa | 369/266 |

FOREIGN PATENT DOCUMENTS

| | | |
|---|---|---|
| 2-139758 | 5/1990 | (JP) . |
| 3-086968 | 4/1991 | (JP) . |
| 6-060531 | 3/1994 | (JP) . |
| 9-190675 | 7/1997 | (JP) . |
| 10-083622 | 3/1998 | (JP) . |
| 10-092094 | 4/1998 | (JP) . |
| 10-124990 | 5/1998 | (JP) . |

* cited by examiner

Primary Examiner—Robert S. Tupper
Assistant Examiner—Julie Anne Watko
(74) Attorney, Agent, or Firm—Burns, Doane, Swecker & Mathis, LLP

(57) ABSTRACT

A storage media driving motor having a shaft, a turntable jointly rotatable with a replaceable storage media mounted on the shaft, a rotor yoke rotating jointly with the turntable, a stator including a core and a winding wound around the core, and a driving magnet fitted into the rotor yoke so as to oppose the stator. The turntable and the rotor yoke are integrally formed so as to define a rotor, and inner-periphery-side concave section opening outwardly in the axial-line direction of the rotor formed in the vicinity of a portion where the rotor is fitted to the shaft, and a center ring for determining the position of the storage media is arranged in the inner-periphery-side concave section.

9 Claims, 4 Drawing Sheets

STORAGE MEDIA DRIVING MOTOR WITH ROTOR MAGNET POSITION DETERMINER AND BALANCING OBJECTS

INDUSTRIAL FIELD OF THE INVENTION

The present invention relates to a driving motor for driving replaceable storage media, such as CD-ROMs and the like.

DESCRIPTION OF THE RELATED ART

A conventional driving motor for storage media, such as a driving motor for CD-ROMs, is shown, for example, in FIG. 5. A lower section of a substantially cylindrical supporting member 3 is fitted into an opening 2 formed in an immobilizing member 1, such as a chassis. A bottom-face opening in the supporting member 3 is blocked by a blocking plate 4. A thrust pad 5 is placed on the blocking plate 4 and is arranged on a bottom section of the supporting member 3. A slide bearing 6 is fitted to the inside of the supporting member 3.

A core 8a is fitted outside of the supporting member 3, and a winding 8b is wound around the core 8a, constituting a stator 8 in cooperation with the core 8a. A shaft 9 is inserted into the slide bearing 6, the lower end of the shaft abutting the thrust pad 5, and an upper end portion of the shaft protruding upward of the supporting member 3. A rotor hub 10 is made of a nonmagnetic material, such as aluminum, and is fitted onto an upper end portion of the shaft 9. A rotor yoke 11 made of a magnetic material, such as a ferrous material, mounted to the rotor hub 10.

The rotor yoke 11 is comprised of a disc-like base section and a pendent lateral section integrally formed downward at the periphery of the base section. The supporting member 3 is received through an opening formed in the central portion of the base section of the rotor yoke 11, in which, the peripheral portion of the opening is fitted to a lower end portion. A driving magnet 12 is inserted to the inside of the pendent lateral section of the rotor yoke 11 and is arranged so as to oppose the stator 8.

As shown in FIG. 5, a turntable 14 is fitted outside of the rotor hub 10. A storage disk D is mounted on an upper face of the turntable 14 via a cushioned material 15. A clamp magnet 16 is buried or set within an upper face of the rotor hub 10 so as to be substantially coplanar with the upper face of the rotor hub. A disk-pressing means on the side of a driving apparatus (not shown) is magnetically attracted by the clamp magnet 16 to immobilize the storage disk D, such as a CD-ROM.

In the above-described conventional driving motor, the direction of current flow to the winding 8b of the stator 8 is controlled so as to cause the stator 8 to generate rotational magnetic fields. By the interaction of the rotational magnetic fields and static magnetic fields of the driving magnet 12, the driving magnet 12, the rotor yoke 11, the rotor hub 10, and the shaft 9 are rotated relative to the static stator 8. Accordingly, the turntable 14 and the storage disk D are rotated in a constant direction.

The aforementioned motor of conventional design has an independently formed rotor yoke 11 and a turntable 14 that rotate with the shaft 9. This configuration gives rise to several problems. One problem is that the number of overall motor components is increased, thereby increasing costs because of increased in-assembly inspection items and the like. Another problem is that the overall height in the direction of rotation-axis line is increased, making size reduction impossible.

Also, with the recent development of high-speed motors, insignificant dimensional deviations in individual sections (for example, variation in shapes of CD-ROMs, character patterns of printing on the disk faces, and labels pasted thereon) which could previously be ignored can no longer be ignored when there is high-speed rotation. These deviations raise a further problem by causing a decrease in balance (increased imbalance) during rotation and run-out of the disk, undesirable vibration, and noise of the motor.

SUMMARY OF THE INVENTION

It is an object of the present invention to provide a small and thin disk driving motor which is driven with high stability at high speed.

Another object of the present invention is to provide a disk driving motor which can be manufactured at low production costs but yet which operates with high rotational performance.

A still further object of the present invention is to provide a disk driving motor that offers high rotational performance despite dimensional errors of the motor.

In one aspect of the present invention, a storage media driving motor is provided having a shaft, a turntable mounted on the shaft and jointly rotatable with a replaceable disk type data storage media, and a rotor yoke integrally formed with the turntable, the turntable and the rotor yoke defining a rotor. An inner-periphery-side concave section opens outwardly in an axial-line direction or the rotor and is formed in the vicinity of a portion where the rotor is fitted to the shaft, and a center ring for determining a position of the data storage disk is arranged in the inner-periphery-side concave section.

Because the rotor yoke and the turntable are integrally formed, the production cost of the motor may be reduced and the accuracy of assembly is improved. In addition, the center ring is arranged within the inner-periphery-side concave section, thereby facilitating an effective assembly process in arrangement of the center ring.

In addition, in another aspect of the present invention, a data storage media driving motor has a position-determiner disposed within the rotor so as to form a circular space which accommodates balancer objects for correcting mass imbalances in the rotor and/or the data storage disk. The balancer objects are accommodated within the circular space so as to be movable in the peripheral direction.

Therefore, if the disk and/or the rotor should have a mass imbalance, runout of the disk, undesirable vibration, or noise of the motor, the balancer objects act to correct the mass imbalance such that the motor rotates with high accuracy.

BRIEF DESCRIPTION OF THE DRAWINGS

These and other objects, features, and advantages of the present invention will become more readily apparent to those skilled in the art upon reading the following detailed description, in conjunction with the appended drawings, in which.

DETAILED DESCRIPTION OF THE PREFERRED EMBODIMENTS

Figure 1:
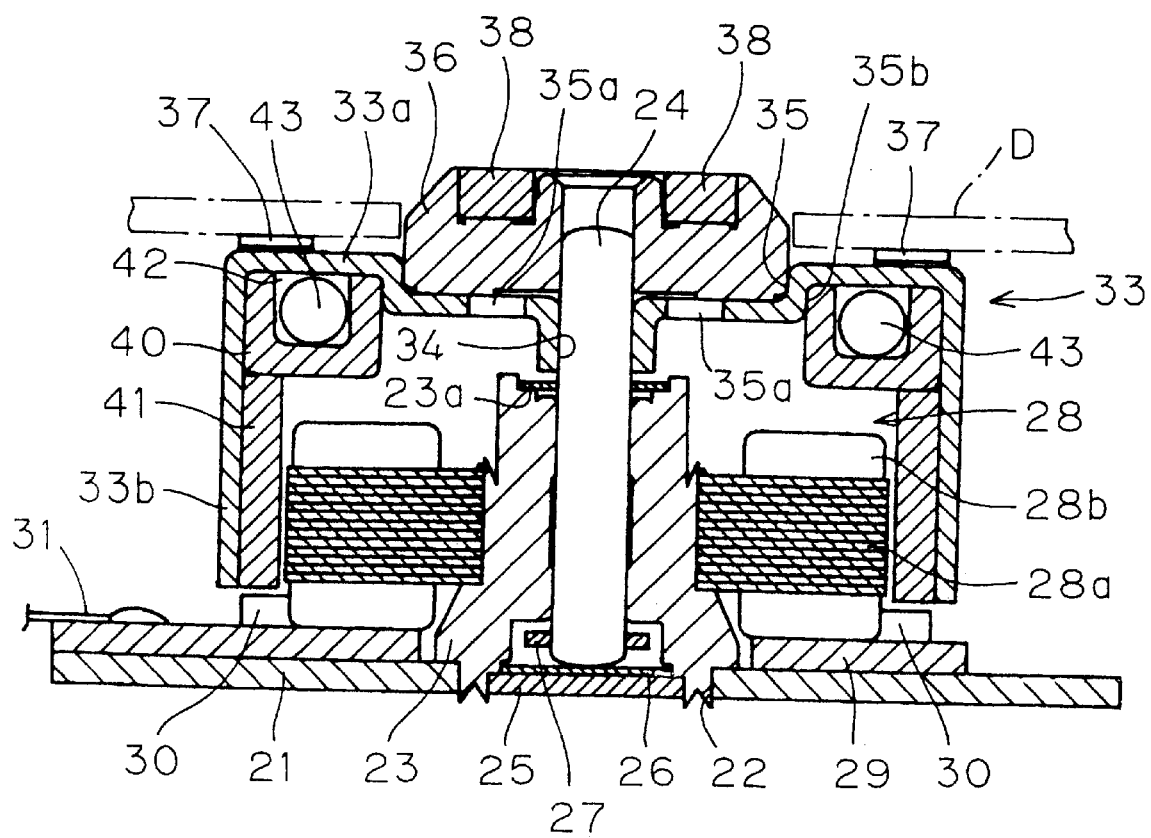
FIG. 1 is a cross-sectional plan view of a storage media driving motor according a first embodiment of the present invention.

Referring to FIG. 1, a description will be given of an embodiment of the present invention as a driving motor for a CD-ROM serving as a storage medium. The symbol 21 denotes an immobilizing member, such as a chassis, having an opening 22. The symbol 23 denotes a sleeve bearing having a lower end portion fitted into the opening 22. The symbol 24 denotes a shaft mounted such that an upper end portion thereof, which is rotatably fitted into the sleeve bearing 23 from a central portion toward the lower end thereof, protrudes upward of the sleeve bearing 23. The symbol 25 denotes a blocking plate for blocking a bottom face of the sleeve bearing 23. The symbol 26 denotes a thrust pad arranged on the blocking plate 25 and a bottom portion of the sleeve bearing 23, the lower end of the shaft 24 contacting the thrust pad 26. The symbol 27 denotes a pop-out-preventing member for preventing the shaft 24 from popping out of the sleeve bearing 23. The symbol 23a denotes a cap member for preventing leakage of lubricating oil impregnated in the sleeve bearing 23.

The symbol 28 denotes a stator comprised of a core 28a fitted outside the sleeve bearing 23 and a winding 28b wound on the core 28a. The symbol 29 denotes a printed-wiring board arranged on the immobilizing member 21. The symbol 30 denotes a rotation-angle detecting Hall device wired on the printed-wiring board 29. The symbol 31 denotes a flexible wiring board connected to the printed-wiring board 29 and outside circuits (not shown).

The symbol 33 denotes a rotor having a disc-like turntable section 33a and a cylindrical rotor-yoke section 33b. In the above, the turntable section 33a is made of a magnetic material, such as a ferrous material; the rotor-yoke section 33b is integrally formed so as to extend downward from the periphery of the turntable section 33a. Then, an insertion bore 34 for the shaft 24 is formed in a central portion of the turntable section 33a. An upper end portion of the shaft 24 is fitted through the insertion bore 34. Also, an inner-periphery-side concave section 35 is formed of a peripheral section of the insertion bore 34, which further opens outwardly in an axial-line direction of the rotor 33. In this inner-periphery-side concave section 35, through holes 35a are formed at three portions at identical pitch in a peripheral direction. The through holes 35a are used for insertion of jigs in a manner to hold an end face of the sleeve bearing 23 when it is tightened to the blocking plate 25. The inner-periphery-side concave section may be formed by pressing, cutting, or otherwise processing the rotor.

As also shown in FIG. 1, a center ring 36, which is made of a resin and which is used to determine the position of a storage disk D such as a replaceable storage medium, CD-ROM or the like, is mounted on the inner-periphery-side concave section 35 of the rotor 33. A cushioned material 37 is arranged on the turntable section 33a of the rotor 33. A clamp magnet 38 is buried or embedded within the center ring 36 so as to be substantially coplanar with an upper face of the center ring 36. In the state wherein the storage disk D is mounted via the cushioned material 37, a disk-pressing means on the side of a driving apparatus (not shown) is magnetically attracted by the clamp magnet 38 to immobilize the storage disk D, such as a CD-ROM. For reference, the center ring 36 may be of a type movable in the axial-line direction and the clamp magnet 38 may be of a type arranged in the disk-pressing means.

A U-shaped position-determiner is shown generally by reference numeral 40. It is formed between an inner peripheral face of the rotor-yoke section 33b and an outer peripheral face of the inner-periphery-side concave section 35, and it is accommodated in an outer-periphery-side concave section 35b opening inwardly in the axial-line direction of the rotor 33. A driving magnet 41 is fitted onto the inside of the rotor-yoke section 33b of the rotor 33. It is arranged so as to oppose the stator 28 via a predetermined gap. In this case, an upper end of the driving magnet 41 abuts a lower face of the position-determiner 40. By this, the position of the driving magnet 41 at the fitting time is determined so that it has a predetermined positional relationship with the stator 28 in the axial-line direction.

Also, a circular space 42 having a four-sided cross section is formed between the position-determiner 40 and a lower face of the turntable section 33a of the rotor 33. In this circular space 42, a plurality of spherical objects 43, such as steel spheres or other spherical objects, are accommodated as balancer objects for correcting imbalances in the motor. All of the individual spherical objects 43 are arranged so as to move in the peripheral direction in the circular space 42. Preferably, the individual spherical objects 43 occupy a space in the circular space 42 which is substantially a semicircle of the circular space 42. Preferably also, surfaces of the balancer objects 43 and surfaces of the circular space 42 do not generate abrasion dust by contacting each other. This is in order to avoid having abrasion dust which may produce friction resistance for the spherical objects 43.

Next, a description will be given of the performance of the motor with the storage disk (CD-ROM) D mounted thereon. A motor control circuit (not shown) controls the direction of current flow to the winding 28b of the stator 28. This causes the stator 28 to generate rotational magnetic fields. In the rotational magnetic field and static magnetic field of the driving magnet 41, a magnetic interaction is caused to rotate the driving magnet 41, the rotor 33, and the shaft 24, relative to the static stator 8. Accordingly, the storage disk D is rotated in a constant direction.

At this time, mass imbalance may occur in the motor because of printing and the like on surfaces of the storage disk D. In this case, the individual spherical objects 43 are induced to move in the circular space 42 along extension lines of the center of rotation and the center of gravity of the storage disk D. This occurs between the time when the motor starts rotation and the time when the rotation exceeds a frequency of rotation resonant with a specific frequency of rotation of the motor. This leads to run-out of the storage disk D and undesirable vibration and noise of the motor.

At a rotation frequency exceeding a resonant rotation frequency in the motor with the storage disk D mounted, the individual spherical objects 43 which are accommodated in the circular space 42 move to positions where imbalances are corrected toward the center of rotation. At this time, the imbalances of rotating members, such as the shaft 24 including the storage disk D, the rotor 33, and the driving magnet 41, becomes zero. In this case, no unnecessary centrifugal force is exerted on the shaft 24 of the motor, and in addition, the central line of the shaft 24 matches the center of gravity of the motor; therefore, the rotating members rotate stably.

In some instances, the motor operates in a normally balanced state in spite of the surfaces of the storage disk D having printing and the like. In such a case, similarly to the abovementioned case, the individual spherical objects 43 gather in one place. This increases vibration between the time when the motor starts rotation and the time when the rotation exceeds a frequency of rotation resonant with a specific frequency of rotation of the motor. This therefore causes the motor to rotate unstably. However, at a rotation frequency exceeding a resonant frequency, the individual spherical objects 43 move to positions substantially at identical pitch in the circular space 42. In such a case where imbalances do not exist, the spherical objects 43 scatter by themselves so as not to disturb the balance of rotation, and thereby allow the motor to continue to rotate stably.

According to the embodiment described above, the rotor 33 is configured by integrally forming the turntable section 33a and the rotor-yoke section 33b. In this case, fewer components for the motor are used, allowing assembly to be simplified. This allows improvement in assembly accuracy and reduction of costs.

Also, the inner-periphery-side concave section 35 receiving the center ring 36 is formed on the turntable section 33a of the rotor 33. In this case, the center ring 36 abuts a bottom face and a sidewall of the inner-periphery-side concave section 35. This facilitates mounting of the center ring 36 on the rotor 33, allowing efficient assembly.

Also, the position-determiner 40 is arranged inside of the rotor 33. Therefore, with the driving magnet 41 inserted inside of the rotor 33, the driving magnet 41 abuts the position-determiner 40 to allow the driving magnet 41 to be easily arranged so as to have the best position relative to the stator 28. This allows improvement in efficiency and accuracy of assembly. For reference, the positional relationship between the stator 28 and the driving magnet 41 is important in design so as to obtain maximum magnetic interaction without causing magnetic vibration. From this viewpoint, the possibility of easily making this arrangement provides a significant merit for assembly.

Also, the circular space 42 is arranged by the position-determiner 40 and the rotor 33, and the plurality of spherical objects 43 are accommodated therein. Therefore, even when the data storage disk D and/or the rotor 33 has mass imbalances, the individual spherical objects 43 move to balance-correction positions to correct the imbalances. In this way, arrangement of the inner-periphery-side concave section 35 in the rotor 33 allows the accommodation of the center ring 36 in the inner-periphery-side concave section 35. It also allows formation of the outer-periphery-side concave section 35b outwardly in the radial direction of the inner-periphery-side concave section 35, formation of the circular space 42 with the position-determiner 40, and a mechanism for compensating for imbalances of the motor. Therefore, the center ring 36 and the circular space 42 are arranged so as to overlap with each other in the radial direction without increasing the height in the direction of the rotation-axis line.

Figure 2:
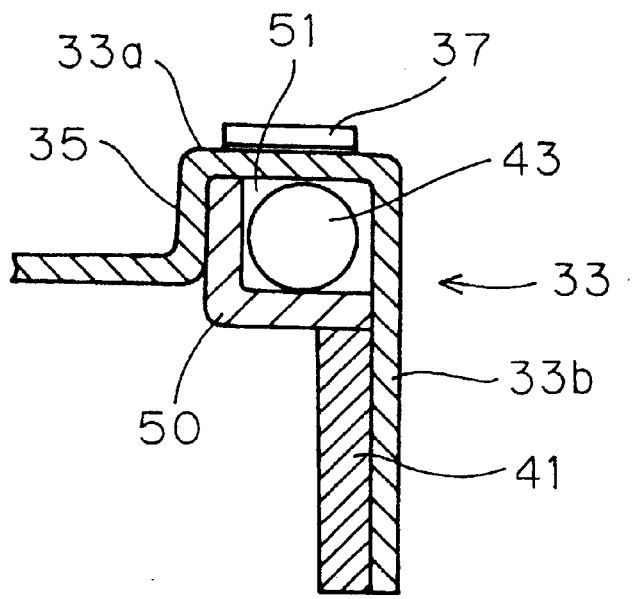
FIG. 2 is a cross-sectional plan view of a portion of a second embodiment according to the present invention.

Similar to the position-determiner 40 having a U-shaped cross section as shown in FIG. 1, according to a further embodiment of the invention, the driving motor may have a position-determiner 50 having an L-shaped cross section, as shown in FIG. 2. In this case also, a circular space 51 having a four-sided cross section is formed between the position-determiner 50 and a lower face of a turntable section 33a of a rotor 33. Also, individual spherical objects 43 are similarly accommodated in the circular space 51.

Figure 3:
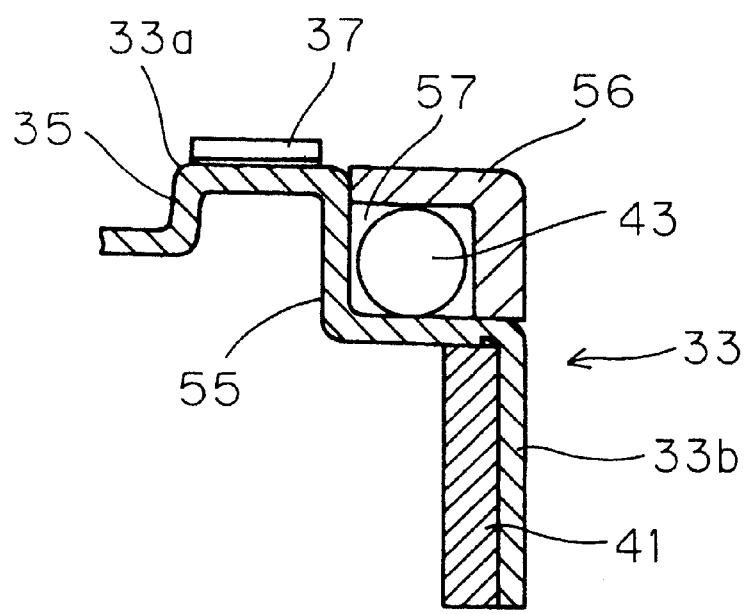
FIG. 3 is a cross-sectional plan view of a portion of a third embodiment according to the present invention.

Also, as shown in FIG. 3 as a still further embodiment, an elevated-step section 55 equivalent to the position-determiner may be formed by bending a peripheral section of a turntable section 33a of a rotor 33 inwardly to the rotor 33 so as to have an L-shape cross section. This allows omission of the position-determiners 40 and 50 of the embodiments described above. To add a mechanism for correcting imbalances in the motor in such a configuration, a circular supplementary member 56 having an L-shaped cross section may be installed outside of the elevated-step section 55, a circular space 57 may be formed, and spherical objects 43 may be accommodated therein.

Figure 4:
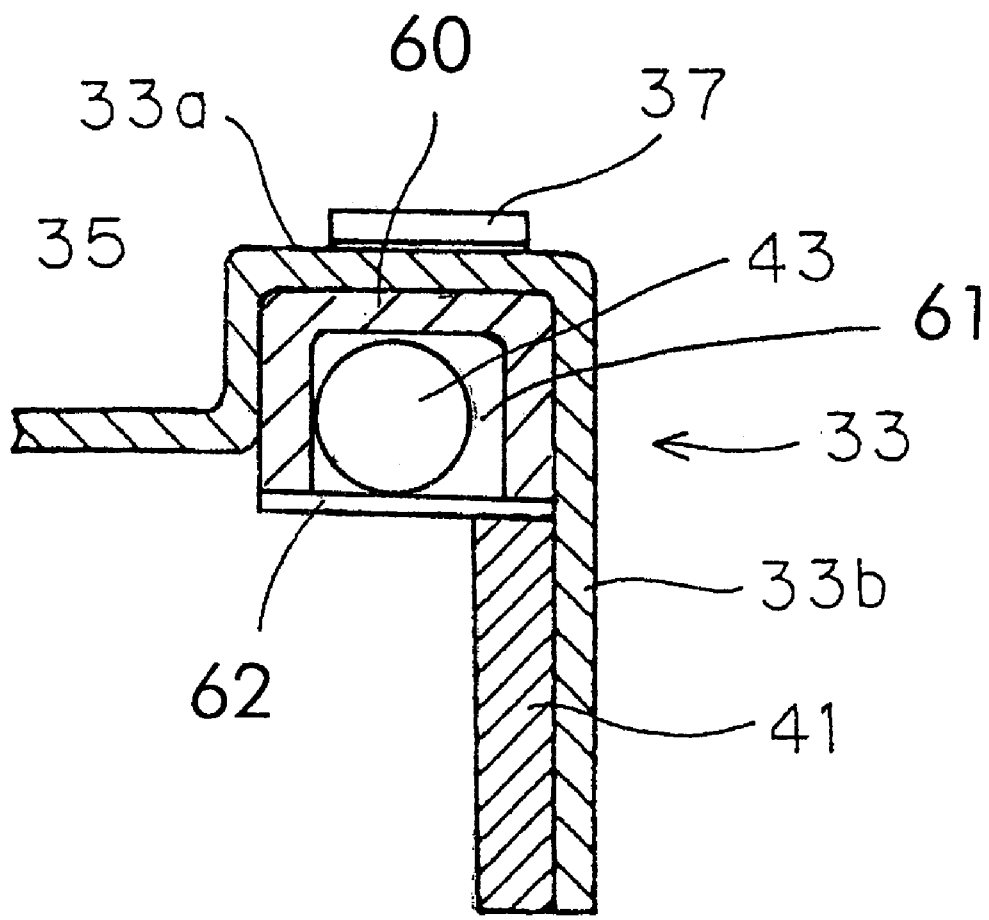
FIG. 4 is a cross-sectional plan view of a portion of a fourth embodiment according to the present invention.
Figure 5:
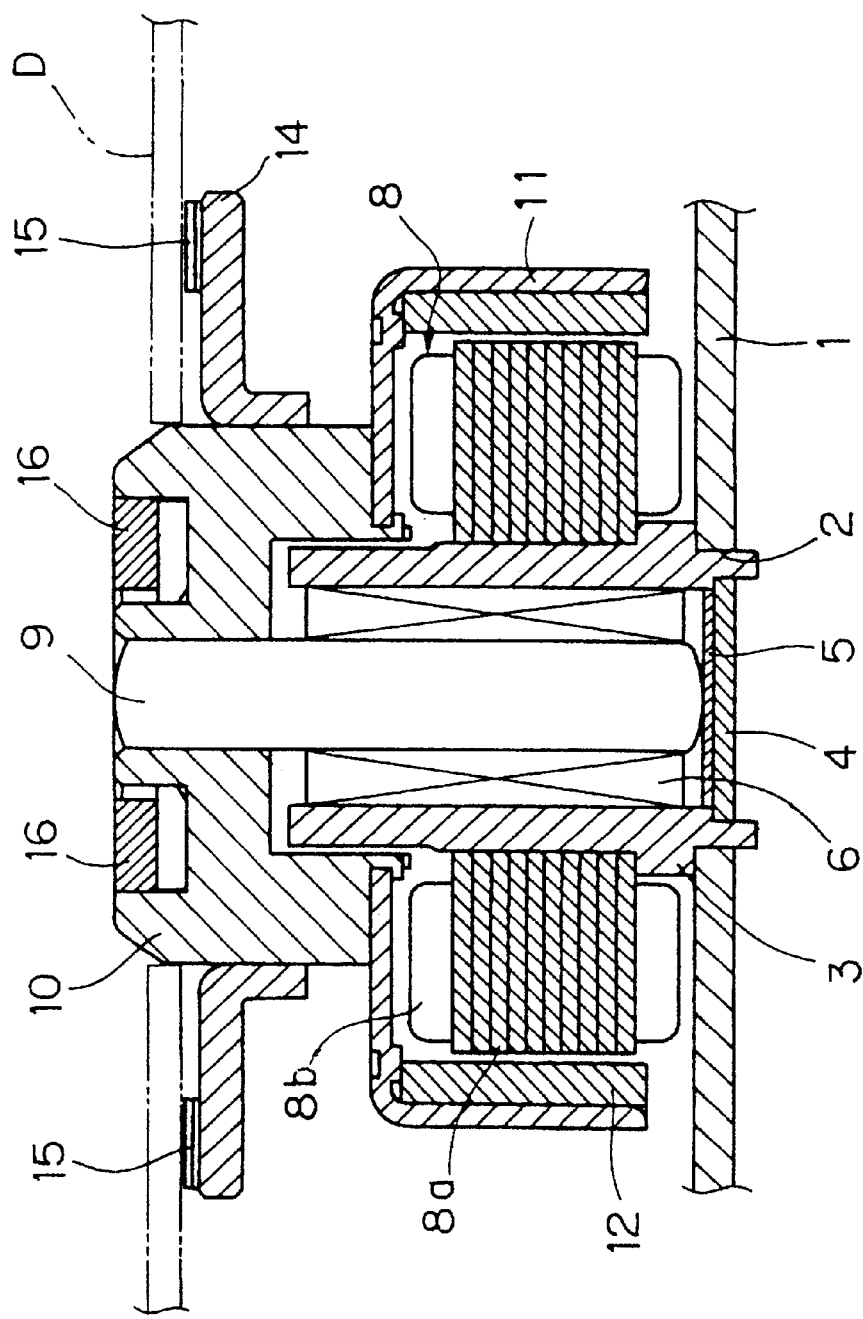
FIG. 5 is a cross-sectional plan view of a conventional driving motor.

Also, as shown in FIG. 4, a circular space 61 for accommodating individual spherical objects 43 may be formed by arranging the position-determiner having the U-shaped cross section (shown in FIG. 1) in an inverted position to that shown in FIG. 1. The thus formed position-determiner 60 has the U-shaped cross section opening downward and the opening of the position-determiner 60 is blocked by a plate 62. Therefore, when the motor is being stopped, if the lubricating oil impregnated in the sleeve bearing 23 oozes and migrates along the wall surface of the rotor 33 or the like due to oil migration phenomenon, the migrating lubricating oil is prevented from flowing into the circular space 61, thereby avoiding lowered imbalance-correction accuracy.

Furthermore, in the above embodiments, descriptions have been made regarding cases in which the spherical objects 43 used as balancer objects are made of steel. However, a soft material may be used for the surface of the individual spherical objects 43. By this arrangement, even when the individual spherical objects 43 collide with each other, collision noise is not easily caused; that is, noise due to the collision can be avoided. Other ways for avoiding noise include use of steel spherical objects individually double-structured with resin-coating, use of rubber spherical objects, and use of steel spherical objects and resin spherical objects that are alternately placed one-by-one.

Also, in the above embodiments, descriptions have been made regarding cases in which the spherical objects 43 are used as balancer objects; however, other rolling objects may be used. Also, the balancer object may be a fluid object, semi-fluid object, powder object, or the like, in which case noise such as that occurring by collision of the spherical objects does not occur.

Also, instead of the sleeve bearing 23, a standard ball bearing or other slide bearing may be used.

In the above embodiments, descriptions have been made regarding the cases in which the present invention is applied to a type of motor in which the shaft 24 and the rotor 33 jointly rotate. However, the present invention may of course also be applied to a type of motor in which a rotor 33 rotates on an immobilized shaft.

Also, in the above embodiments, the driving motor is described as having imbalance-correcting balancer objects. However, when the requirement for such high performance is not necessary, the balancer objects and, furthermore, the position-determiner, may be omitted. That is, depending on the requirements for performance, costs, and the like, selection is made for options such as those regarding whether or not balancer objects are included and regarding shape-modification. The above flexibility allows a wide variety of motors to be realized with a minimized number of components.

As described above, according to the present invention, the turntable and the rotor yoke are integrally formed to allow reduction of the number of motor components, reduction of costs, and improvement of assembly accuracy. In addition, since the inner-periphery-side concave section is formed inside of the turntable so as to be concave, the center ring can be arranged without increasing the length in the axial-line direction of the center ring. Also, the position of the center ring is determined by a sidewall and a bottom face of the concave section. This facilitates effective assembly involving the arrangement of the center ring.

Also, according to the present invention, the position of the position-determiner is determined by a sidewall and a bottom face of the outer-periphery-side concave section. This facilitates effective assembly involving in the arrangement of the position-determiner. Furthermore, in the arrangement of the driving magnet on the rotor, the position of the driving magnet is determined by fitting the magnet in the axial-line direction so that it abuts the position-determiner. Therefore, by using the position-determiner, the driving magnet can be easily arranged so as to have the most suitable position relative to the stator. For reference, the relative position between the stator and the driving magnet is important in design to determine rotation characteristics of a motor.

Further, even when imbalances occur during rotation of the motor, the balancer objects move in the circular space so as to correct the imbalances. The position-determiner forming the mechanism for correcting such imbalances is accommodated in the outer-periphery-side concave section. Therefore, addition of this mechanism allows the arrangement of the position-determiner without increasing the distance in the axial-line direction of the motor. In forming this mechanism, since the position-determiner is a member for determining the driving magnet, no additional components are involved.

And still further, even in an arrangement in which the position-determiner is integrally formed with the rotor, the supplementary member is added so as to form the circular space. Therefore, even when imbalances occur during rotation of the motor, the balancer objects move in the circular space so as to correct the imbalances and so as to stabilize rotation of the motor, resulting in provision of a motor having good rotational performance.

The present invention is not to be restricted to the above embodiments. As will be apparent to one skilled in the art, various other modifications may be applied without departing from the scope of the invention.

What is claimed is:

1. A replaceable disk data storage media driving motor comprising:
    a shaft;
    a turntable mounted on the shaft and jointly rotatable with a replaceable media;
    a rotor yoke rotatable with the turntable;
    a stator comprised of a core and a winding wound around the core;
    a driving magnet fitted into the rotor yoke so as to oppose the stator;
    a position determiner axially aligned with the driving magnet for axially positioning the driving magnet and located within the rotor so as to define a circular space within the rotor, and
    a plurality of balancing objects radially moveably accommodated within the circular space;
    wherein the turntable and the rotor yoke are integrally formed so as to define a single one-piece rotor.

2. A driving motor as stated in claim 1, wherein the turntable is provided with an inner-peripheral-side concave section opening outwardly formed in a vicinity of a portion where the rotor is fitted to the shaft.

3. A driving motor as stated in claim 2, wherein a center ring for determining a position of the replaceable storage media is arranged in the inner-periphery-side concave portion.

4. A driving motor as stated in claim 1, wherein the position determiner is provided with an annular groove, a lower surface of the turntable covering an opening of the annular groove for forming the circular space.

5. A driving motor as stated in claim 1, wherein the position determiner is provided with an annular groove, an annular plate member being attached to the position determiner such that the annular plate member covers the annular groove to form the circular space.

6. A driving motor as stated in claim 1, wherein the position determiner has an L-shaped cross section configuration, the position determiner cooperating with the rotor for forming the circular space.

7. A replaceable disk data storage media driving motor comprising:
    a shaft;
    a turntable mounted on the shaft and jointly rotatable with a replaceable storage media;
    a rotor yoke rotatable jointly with the turntable;
    a stator comprised of a core and a winding wound around the core; and
    a driving magnet fitted into the rotor yoke so as to oppose the stator;
    a position determiner for axially positioning the driving magnet being located within the rotor so as to define a circular space within the rotor, and
    a plurality of balancing objects radially moveably accommodated within the circular space,
    wherein the turntable and the rotor yoke are integrally formed so as to define a rotor, and
    wherein the position determiner is provided with an annular groove, a lower surface of the turntable covering an opening of the annular groove for forming the circular space.

8. A replaceable disk data storage media driving motor comprising:
    a shaft;
    a turntable mounted on the shaft and jointly rotatable with a replaceable storage media;
    a rotor yoke rotatable jointly with the turntable;
    a stator comprised of a core and a winding wound around the core; and
    a driving magnet fitted into the rotor yoke so as to oppose the stator;
    a position determiner for axially positioning the driving magnet being located within the rotor so as to define a circular space within the rotor, and
    a plurality of balancing objects radially moveably accommodated within the circular space,
    wherein the turntable and the rotor yoke are integrally formed so as to define a rotor, and
    wherein the position determiner is provided with an annular groove, an annular plate member being attached to the position determiner such that the annular plate member covers the annular groove to form the circular space.

9. A replaceable disk data storage media driving motor comprising:
    a shaft;
    a turntable mounted on the shaft for jointly rotating with a replaceable storage media;
    a rotor yoke for jointly rotating with the turntable;
    a stator comprised of a core and a winding wound around the core;

a driving magnet fitted into the rotor yoke so as to oppose the stator;

a position determiner axially aligned with the driving magnet for axially positioning the driving magnet, said position determiner being disposed relative to the rotor so as to define a circular space with the rotor, and a plurality of balancing objects radially moveably accommodated within the circular space;

wherein the turntable and the rotor yoke are integrally formed so as to define a single one-piece rotor.

* * * * *